(12) United States Patent
Benchenaa et al.

(10) Patent No.: US 9,679,083 B2
(45) Date of Patent: Jun. 13, 2017

(54) DISPLAYING SORT RESULTS ON A MOBILE COMPUTING DEVICE

(71) Applicant: Intel Corporation, Santa Clara, CA (US)

(72) Inventors: Hayat Benchenaa, London (GB); Daren P. Wilson, London (GB); Aras Bilgen, Hillsboro, OR (US); Dirk Hohndel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 201 days.

(21) Appl. No.: 13/729,339

(22) Filed: Dec. 28, 2012

(65) Prior Publication Data

US 2014/0188907 A1  Jul. 3, 2014

(51) Int. Cl.
*G06F 17/30* (2006.01)

(52) U.S. Cl.
CPC .............................. *G06F 17/30994* (2013.01)

(58) Field of Classification Search
CPC .................................. G06F 17/30; G06F 17/00
See application file for complete search history.

(56) References Cited

U.S. PATENT DOCUMENTS

| | | | |
|---|---|---|---|
| 6,711,565 B1 * | 3/2004 | Subramaniam ... | G06F 17/30864 |
| 6,801,229 B1 | 10/2004 | Tinkler | |
| 7,464,072 B1 * | 12/2008 | Subramaniam ... | G06F 17/30392 |
| 7,467,133 B2 * | 12/2008 | Subramaniam ... | G06F 17/30392 |
| 7,725,447 B2 * | 5/2010 | Subramaniam ... | G06F 17/30392 707/705 |
| 7,840,076 B2 * | 11/2010 | Bouguet ........... | G06F 17/30256 382/224 |
| 7,913,182 B2 * | 3/2011 | Bear .................... | G06Q 10/107 345/1.1 |
| 7,962,446 B2 * | 6/2011 | Subramaniam ... | G06F 17/30392 707/610 |
| 8,281,238 B2 | 10/2012 | Sweeney et al. | |
| 8,856,138 B1 * | 10/2014 | Neubeck ........... | G06F 17/30327 707/745 |
| 8,880,500 B2 * | 11/2014 | Subramaniam ... | G06F 17/30392 707/706 |
| 2003/0036927 A1 * | 2/2003 | Bowen .................. | G06F 19/322 705/4 |
| 2006/0265413 A1 | 11/2006 | Blencowe | |

(Continued)

OTHER PUBLICATIONS

International Search Report and Written Opinion received for International Application No. PCT/US2013/077167, mailed Apr. 17, 2014, 12 pages.

(Continued)

*Primary Examiner* — Farhan Syed
(74) *Attorney, Agent, or Firm* — Barnes & Thornburg LLP

(57) ABSTRACT

Technologies for displaying sort results on a computing device includes determining a plurality of sort criteria of the set of data items to be sorted and associating a visual property to each sort criteria. A sort priority of sort criteria may also be determined. The set of data items are sorted based on the sort criteria and sort priority. The sort result is displayed using the visual properties of identify the sorting order of each corresponding sort criteria. The visual properties may include, for example, the display location, size, color, animation, or other visual aspect of the data items.

19 Claims, 5 Drawing Sheets

(56) References Cited

U.S. PATENT DOCUMENTS

| | | | |
|---|---|---|---|
| 2007/0043651 A1* | 2/2007 | Xiao | G06Q 30/08 705/37 |
| 2007/0106639 A1* | 5/2007 | Subramaniam | G06F 17/30392 |
| 2007/0118504 A1* | 5/2007 | Subramaniam | G06F 17/30392 |
| 2007/0120857 A1 | 5/2007 | Patel et al. | |
| 2007/0174257 A1* | 7/2007 | Howard | G06F 17/30696 |
| 2007/0214145 A1* | 9/2007 | Subramaniam | G06F 17/30392 |
| 2007/0299813 A1* | 12/2007 | Subramaniam | G06F 17/30392 |
| 2008/0071736 A1* | 3/2008 | Smith | G06F 17/30289 |
| 2008/0104521 A1* | 5/2008 | Dubinko | G06F 17/30867 715/744 |
| 2008/0183699 A1* | 7/2008 | Hu | G06F 17/30864 |
| 2009/0006379 A1* | 1/2009 | Shen | G06F 17/30657 |
| 2011/0099465 A1 | 4/2011 | Haberl | |
| 2011/0099500 A1* | 4/2011 | Smith | G06F 3/0482 715/771 |
| 2012/0089624 A1* | 4/2012 | Subramaniam | G06F 17/30392 707/752 |
| 2012/0194851 A1* | 8/2012 | Srinivasmurthy K | G06F 3/1204 358/1.15 |
| 2012/0221552 A1* | 8/2012 | Reponen | G06F 17/3087 707/722 |
| 2012/0323933 A1* | 12/2012 | He | G06Q 10/109 707/749 |
| 2013/0046935 A1* | 2/2013 | Ramanathan | G06F 17/30132 711/119 |
| 2013/0055167 A1* | 2/2013 | Leong | G06F 3/048 715/854 |
| 2013/0124507 A1* | 5/2013 | Gartland | G06F 17/30867 707/723 |
| 2013/0159305 A1* | 6/2013 | Starks | G06F 17/30705 707/737 |
| 2013/0290324 A1* | 10/2013 | Gibergues | G06F 17/30867 707/731 |
| 2014/0033120 A1* | 1/2014 | Bental | G06F 17/30 715/803 |
| 2014/0123028 A1* | 5/2014 | Kamity | H04N 21/2743 715/753 |
| 2014/0129545 A1* | 5/2014 | Gargi | G06F 17/30867 707/722 |
| 2014/0184519 A1* | 7/2014 | Benchenaa | G06F 3/0488 345/173 |
| 2014/0189030 A1* | 7/2014 | Benchenaa | H04L 51/24 709/207 |
| 2014/0250536 A1* | 9/2014 | Coblentz | G06F 21/10 726/27 |
| 2014/0258336 A1* | 9/2014 | Scott | G06F 21/6227 707/783 |
| 2014/0317096 A1* | 10/2014 | Elias | G06F 7/00 707/722 |

OTHER PUBLICATIONS

European Search Report for Application No. 13869326.2-1951, dated Jul. 21, 2016, 10 pages.

* cited by examiner

DISPLAYING SORT RESULTS ON A MOBILE COMPUTING DEVICE

BACKGROUND

Mobile computing devices are becoming ubiquitous tools for personal, business, and social uses. The portability of mobile computing devices is increasing as the size of the devices decrease and processing power increases. In fact, many computing devices are sized to be hand-held by the user to improve ease of use. Additionally, modern mobile computing devices are equipped with increased processing power and data storage capability to allow such devices to perform advanced processing. Further, many modern mobile computing devices are capable of connecting to various data networks, including the Internet, to retrieve and receive data communications over such networks. As such, modern mobile computing devices are powerful, often personal, tools untethered to a particular location.

To facilitate portability, many mobile computing devices include displays of limited size to thereby decrease the overall size of the device. However, the small display size of mobile computing devices may create difficulties for users in performing certain functions on the mobile computing device. For example, the sorting of data items on a relatively small display can be cumbersome and difficult especially when each data item includes multiple properties. In such circumstances, the user is often required to scroll or pan the viewport of the display to view the additional properties of the sorted data items to fully understand the sort results. This inability to view multiple properties of the data items contemporaneously on the display (e.g., within the viewport of the display) is an even more significant concern when multi-criteria sorts are performed (i.e., the multiple properties of the data items are sorted at the same time). In such cases, the user may be especially interested in, not only the sorted order of the primary property, but also the sorted order of other properties on which the sort was conducted.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
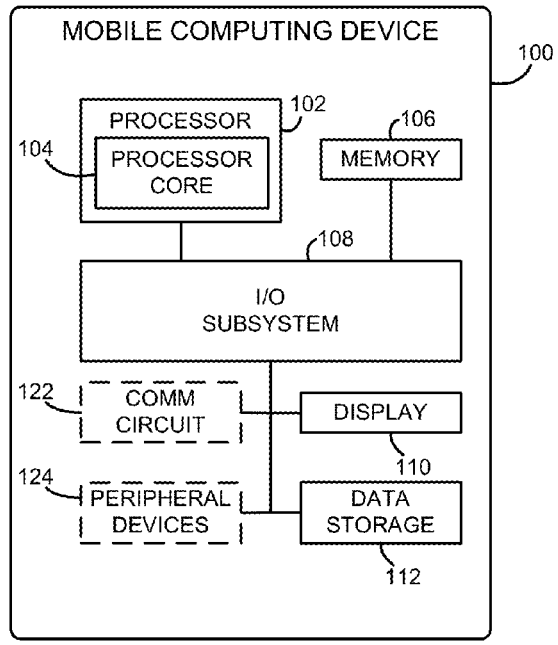
FIG. 1 is a simplified block diagram of at least one embodiment of a mobile computing device for displaying sort results.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in one embodiment, a mobile computing device 100 is configured to sort a set of data items using multiple sort criteria and display the sorting results on a display 110 of the device 100 using a different visual property associated with each sort criteria to identify the sorting order of the corresponding sort criteria. Any property of the data items that is capable of comparison between each other may be used as individual sort criteria. Each sort may include one, two, or more sort criteria on which the sort is based. In embodiments in which multiple sort criteria are used, a sort priority of the determined sort criteria may be used to perform the sort. The resulting sort order of each sort criteria is illustrated on the display by modifying a corresponding visual property of the displayed data items for each sort criteria. Such visual properties may include, but are not limited to, the position of the sorted data item; the length, width, or overall size of the sorted data item; the background color of the sorted data item; the text attribute of the sorted data item; a graphical effect of the sorted data item; an animation effect of the sorted item; and/or other visual property of each sorted data item. In this way, a multiple-sort-criteria sort result may be displayed to the user on a relatively compact display space allowing the user to quickly and efficiently discriminate between the sorting order of multiple criteria while reducing the need to scroll, pan, and/or zoom the viewport of the display 110 to view each sort criteria of interest.

The mobile computing device 100 may be embodied as any type of mobile computing device capable of performing the functions described herein. For example, in some embodiments, the mobile computing device 100 may be embodied as a "smart" phone, a tablet computer, a mobile media device, and a game console, a mobile internet device (MID), a personal digital assistant, a laptop computer, a mobile appliance device, or other mobile computing device. As shown in FIG. 1, the illustrative mobile computing device 100 includes a processor 102, a memory 106, an input/output subsystem 108, and a display 110. Of course, the mobile computing device 100 may include other or additional components, such as those commonly found in a mobile computing device and/or communication device (e.g., various input/output devices), in other embodiments. Additionally, in some embodiments, one or more of the illustrative components may be incorporated in, or otherwise from a portion of, another component. For example, the memory 106, or portions thereof, may be incorporated in the processor 102 in some embodiments.

The processor 102 may be embodied as any type of processor capable of performing the functions described herein. For example, the processor may be embodied as a single or multi-core processor(s) having one or more processor cores 104, a digital signal processor, a microcontroller, or other processor or processing/controlling circuit. Similarly, the memory 106 may be embodied as any type of volatile or non-volatile memory or data storage currently known or developed in the future and capable of performing the functions described herein. In operation, the memory 106 may store various data and software used during operation of the mobile computing device 100 such as operating systems, applications, programs, libraries, and drivers. The memory 106 is communicatively coupled to the processor 102 via the I/O subsystem 108, which may be embodied as circuitry and/or components to facilitate input/output operations with the processor 102, the memory 106, and other components of the mobile computing device 100. For example, the I/O subsystem 108 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 108 may form a portion of a system-on-a-chip (SoC) and be incorporated, along with the processor 102, the memory 106, and other components of the mobile computing device 100, on a single integrated circuit chip.

The display 110 of the mobile computing device 100 may be embodied as any type of display on which information may be displayed to a user of the mobile computing device 100. For example, the display 110 may be embodied as, or otherwise use, any suitable display technology including, for example, a liquid crystal display (LCD), a light emitting diode (LED) display, a cathode ray tube (CRT) display, a plasma display, and/or other display usable in a mobile computing device. Additionally, in some embodiments, the display 110 may be embodied as a touchscreen display and include an associated touchscreen sensor (not shown) to receive tactile input and data entry from the user.

The mobile computing device 100 may also include a data storage 112. The data storage 112 may be embodied as any type of device or devices configured for the short-term or long-term storage of data such as, for example, memory devices and circuits, memory cards, hard disk drives, solid-state drives, or other data storage devices. In the illustrative embodiment, the mobile computing device 100 may store the data items to be sorted and various policy and reference databases in the data storage 112 as discussed in more detail below in regard to FIG. 2.

In some embodiments, the mobile computing device 100 may also include a communication circuit 122. The communication circuit 122 may be embodied as one or more devices and/or circuitry for enabling communications with one or more remote devices over a network. The communication circuit 122 may be configured to use any suitable communication protocol to communicate with remote devices over such network including, for example, cellular communication protocols, wireless data communication protocols, and/or wired data communication protocols.

Additionally, in some embodiments, the mobile computing device 100 may further include one or more peripheral devices 124. Such peripheral devices 124 may include any type of peripheral device commonly found in a mobile computing device such as speakers, a hardware keyboard, input/output devices, peripheral communication devices, antennas, and/or other peripheral devices.

Figure 2:
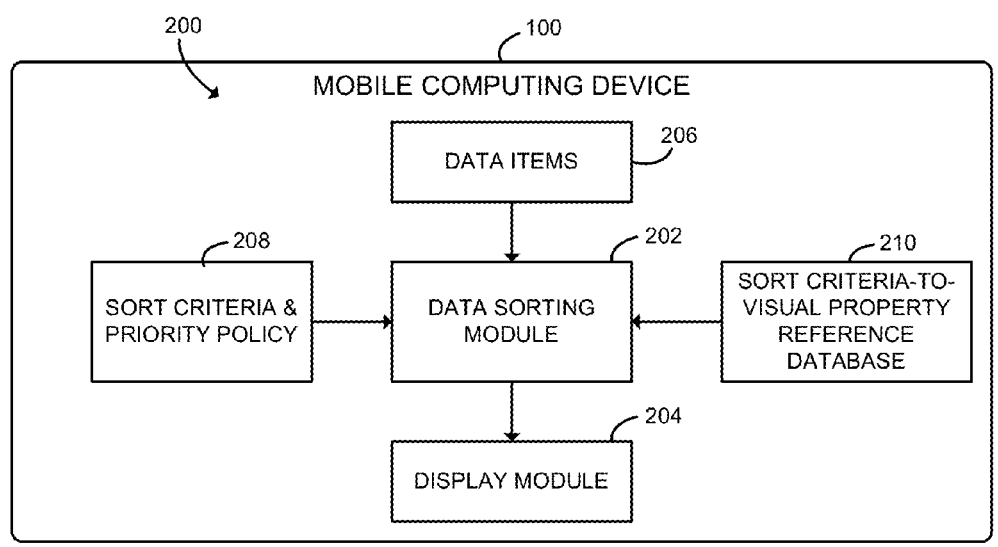
FIG. 2 is a simplified block diagram of at least one embodiment of an environment of the mobile computing device of FIG. 1.

Referring now to FIG. 2, in one embodiment, the mobile computing device 100 establishes an environment 200 during operation. The illustrative environment 200 includes a data sorting module 202 and a display module 204, each of which may be embodied as software, firmware, hardware, or a combination thereof. During use, the data sorting module 202 is configured to sort a selection of data items 206, which may be stored in the data storage 112 and/or memory 106. The data items 206 may be embodied as any type of data items having one or more properties that may be compared to each other and used as individual sort criteria to sort the data items 206. The data items 206 may be generated on the mobile computing device 100 (e.g., spreadsheet data) or retrieved from a remote source via the communication circuit 122.

As discussed in more detail below, the data sorting module 202 may utilize any sort criteria to sort the data items 206. In some embodiments, the user may select, or otherwise define, the sort criteria of the data items 206 to be used in the sort. Additionally, the user may select, or otherwise define, the relative sort priority between the selected sort criteria (i.e., which sort criteria should be sorted first, second, etc.). Alternatively, in some embodiments, the data sorting module 202 may access a sort criteria and priority policy 208, which may be stored in the data storage 112, to infer which properties of the data items 206 should be used as sort criteria and determine the relative sort priority of the inferred sort criteria. As such, the sort criteria and priority policy 208 may be embodied as a set of rules from which the data sorting module 202 may infer the sort criteria and sort priority of the data items 206 with minimal or no intervention by the user. Such rules may be historical-based rules that are generated based on the user's historical selection of sort criteria and sort priority, may be pre-defined by the user, or generated and obtained from a remote source such as a third party (e.g., a third-party from which the data items 206 were obtained). As such, each rule of the sort criteria and priority policy 208 may be data item-specific, user-specific, application-specific, and/or global.

As discussed above, the data sorting module 202 associates a visual property of the data items 206 with each selected sort criteria. In some embodiments, the user may select, or otherwise define, each visual property of the data items 206 to be associated with each selected or inferred sort criteria. Alternatively, in some embodiments, the data sorting module 202 may access a sort criteria-to-visual property reference database 210, which may be stored locally on the data storage 112 or memory 106 or stored remotely on a remote server or other computing device. Similar to the sort criteria and priority policy 208, the sort criteria-to-visual property reference database 210 may be embodied as a set of rules from which the data sorting module 202 may infer or match visual properties of the data items to each selected or inferred sort criteria with minimal or no interaction from the user. The sort criteria-to-visual property reference database 210 rules may define each visual property based on any aspect of the selected/inferred sort criteria such as the type of criteria, the priority order of the criteria, the nature or content of the data items, the context of the data and/or data sort, and/or other aspects of the data items 206. Similar to the rules of the sort criteria and priority policy 208, the rules of the sort criteria-to-visual property reference database 210 may be embodied as historical-based rules that are generated based on the user's historical selection of visual properties, may be otherwise pre-defined by the user, or generated and obtained from a remote source such as a third party (e.g., a third-party from which the data items 206 were obtained). As such, each rule of the sort criteria-to-visual property reference database 210 may be data item-specific, user-specific, application-specific, and/or global. Additionally, such rules may be defined at design time, compile time, or at runtime by the user, other components of the mobile computing, and/or by third parties.

As discussed above, each defined visual property may be embodied as any type of visual property of the data items 206. For example, the visual properties may include, but are not limited to, the position on the display 110 of the sorted data item, the length of the sorted data item, the width of the sorted data item, the overall size of the sorted data item, a background color of the sorted data item, a text attribute of the sorted data item (e.g., color, size, weight, font style, etc.), a graphical effect of the sorted data item (e.g., a tonal change, transparency, layering effect, etc.), an animation effect of the sorted data item (e.g., glow, fade, shadow, pulse, vibrate, etc.), and/or other visual property of each sorted data item.

The display module 204 is configured to display the sorted data items 206 in a sort order defined by the sort results based on the sort criteria and the associated sort priority of each sort criteria. To do so, the display module 204 utilizes the visual property associated with each sort criteria to identify the sort order of that particular sort criteria. For example, in one embodiment, the data items 206 may be embodied as a list of vehicles that the user desires to compare based on vehicle cost and gas mileage of each vehicle. In such an embodiment, the user may define the vehicle cost as the sort criteria having the highest priority level and the gas mileage as the sort criteria having the second highest priority level. Additionally, the user may define a visual property for each sort criteria such as, for example, display position for the vehicle cost and text color for the gas mileage. If so, the display module 204 will display the sorted data items in a sorted order in which the position of each data item 206 (i.e., each vehicle) on the display 110 is determined by the cost of the vehicle and the color of the data item 206 is determined by the gas mileage of the vehicle. For example, a low priced, high efficiency vehicle may be listed first (assuming ascending order) and use a green text color, while a high priced, low efficiency vehicle may be displayed lower in the sorted results and use a grey, black, or red text color (as chosen by the user or determined based on the sort criteria-to-visual property reference database 210). In some embodiments, the display module 204 may display each data item 206 as a data tile (e.g., a data block or other geometric shape) in which information related to the particular data item 206 may be displayed (e.g., the name of the data item, reviews of the data item, other sort criteria, links to online stores or websites, etc.).

Figure 3:
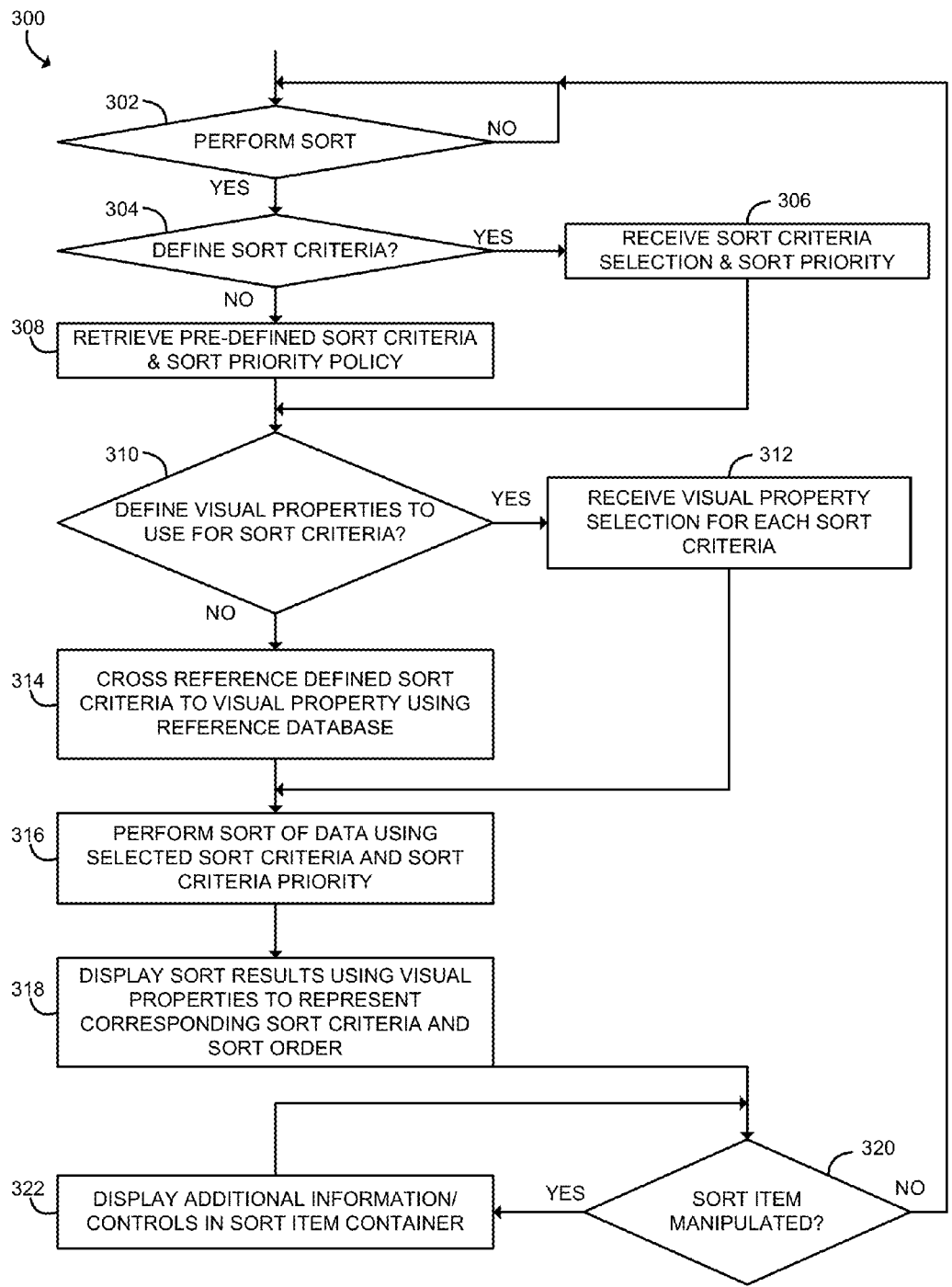
FIG. 3 is a simplified flow diagram of at least one embodiment of method for generating and displaying sort results on a display of the mobile computing device of FIGS. 1 and 2.

Referring now to FIG. 3, in use, the mobile computing device 100 may execute a method 300 for generating and displaying sort results of a data item sort on the display 110 of the device 100. The method 300 begins with block 302 in which the mobile computing device 100 determines whether the user desires to perform a sort of the data items 206. If so, the method 300 advances to block 304 in which the mobile computing device 100 determines whether the user desires to specifically define one or more sort criteria of the data items 206 to be sorted. As discussed above, each sort criteria corresponds to a property of the data items 206 that may be compared to each other to perform the sort. One, two, or more sort criteria may be defined for each sort. If the user desires to manually select or define the sort criteria, the method 300 advances to block 306 in which the user may select or define which properties of the data items 206 are to be used as sort criteria and the relative sort priority of each defined sort criteria. However, if the user does not desire to manually select the sort criteria and priority in block 304, the method 300 advances to block 308 in which the data sorting module 202 retrieves the sort criteria and priority policy 208 from the data storage 112 and/or memory 106. The data sorting module 202 utilizes the sort criteria and priority policy 208 to infer the sort criteria and relative sort priority of each inferred sort criteria of the data items 206. To do so, the data sorting module 202 may compare the data items 206, or aspects/properties of the data items 206, to the rules defined in the sort criteria and priority policy 208. As discussed above, such rules may be based on the historical user interaction with the data items 206 or other sorts, may be provided by a third party or obtained in connection with the data items 206, may be pre-defined by the user, and/or may be embodied as other rules usable to determine the sort criteria and sort priority of the sort criteria for the data items 206.

After the sort criteria and relative sort priority of the data items 206 have been determined in either blocks 306 or 308, the method 300 advances to block 310 in which the mobile computing device 100 determines whether the user desires to specifically define the visual properties of the data items 206 that are to be correlated to the sort criteria. If so, the method advances to block 312 in which the user may select or define a visual property (e.g., position, text color, background color, graphical effect, animation, etc.) of the data items 206 for each determined sort criteria to be sorted. In some embodiments, the data sorting module 202 may provide a graphical user interface to the user on the display 110 to facilitate the user's selection of visual properties (which may be predefined as a global set of available visual properties or a subset of visual properties determined based on the user, application, content of the data items 206, or other criteria).

If, however, the user does not desire to manually define the visual properties to be associated with the determined sort criteria in block 310, the method 300 advances to block 314 in which the data sorting module 202 retrieves the sort criteria-to-visual property reference database 210 from the data storage 112 and/or memory 106. The data sorting module 202 utilizes the reference database 210 to infer a visual property for each defined sort criteria of the data items 206. To do so, the data sorting module 202 may compare the defined sort criteria and/or data items to the rules defined in the reference database 210. As discussed above, the sort criteria-to-visual property reference database 210 rules may define each visual property based on any one or more aspects of the defined sort criteria, such as the type of criteria, the priority order of the criteria, and/or other aspects of each sort criteria. Additionally or alternatively, the rules may define each visual property based on one or more aspects of the data items 206, such as the nature or content of the data items 206, the context of the data items 206, the context of data sort, and/or other aspects of the data items 206. Further, the rules may define each visual property based on other data related to the sort such as the user performing the sort, any application related to the sort or data items 206, and/or other criteria.

After the visual properties have been defined for each sort criteria in blocks 312 or 314, the method 300 advances to block 316 in which the data sorting module 202 performs the sort of the data items 206 using the defined sort criteria and sort priority. As discussed above, the sort priority defines the order of priority of each sort criteria (e.g., which sort criteria to sort first). The data sorting module 202 may utilize any suitable sorting algorithm to sort the data items as a function of the sort criteria and relative sort priority of each sort criteria. After the data sorting module 202 has completed the sorting procedure, the display module 204 displays the sort result on the display 110 in block 318. To do so, as discussed above, the display module 204 displays each data item 206 on the display 110 according to the sort result of the data sorting module 202 utilizing the visual property associated with each sort criteria to identify the sort order of each associated sort criteria. In some embodiments, the display module 204 displays each sorted data item 206 as a data item tile, which may have any type of geometric shape (e.g., rectangular tile, elliptical tile, circular tile, irregular tile, or other shape). Depending on the size of the data item tile, the display module 204 may display additional information associated with each data item on the respective data item tile. In this way, a multiple-sort-criteria sort result may be displayed to the user in a condensed informational format that allows the user to quickly view and comprehend the sort order of the multiple sort criteria.

After the display module 204 has displayed the sort results on the display 110 in block 318, the method advances to block 320 in which the mobile computing device 100 determines whether the user has manipulated one or more of the sorted data items 206. For example, the user may expand or select a data item tile or otherwise interact with one or more sorted data items 206. If not, the method 300 loops back to block 302 in which the mobile computing device 100 determines whether the user desires to perform another sort. However, if the user has manipulated one or more of the sorted data items 206 in block 320, the method 300 advances to block 322 in which additional information is displayed on the manipulated data item tile to provide further information regarding the particular data item and/or controls usable by the user to further manipulate the particular data item or sort. Subsequently, the method 300 loops back to block 320 to determine whether the user has manipulated another sorted data item 206.

Figure 4:
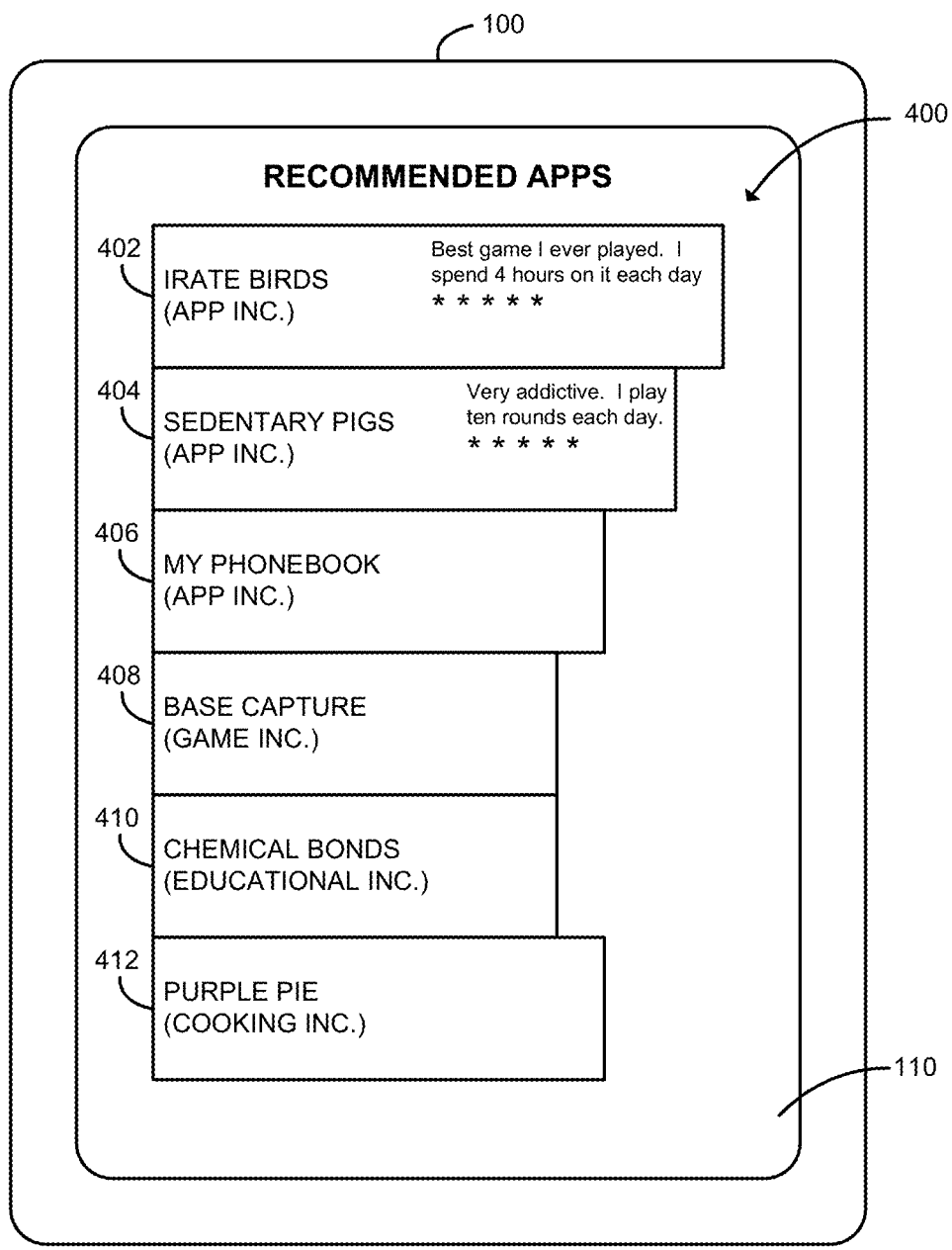
FIG. 4 is a simplified illustration of at least one embodiment of a sort result generated by the method of FIG. 3 and displayed on the display of the mobile computing device of FIGS. 1 and 2.
Figure 5:
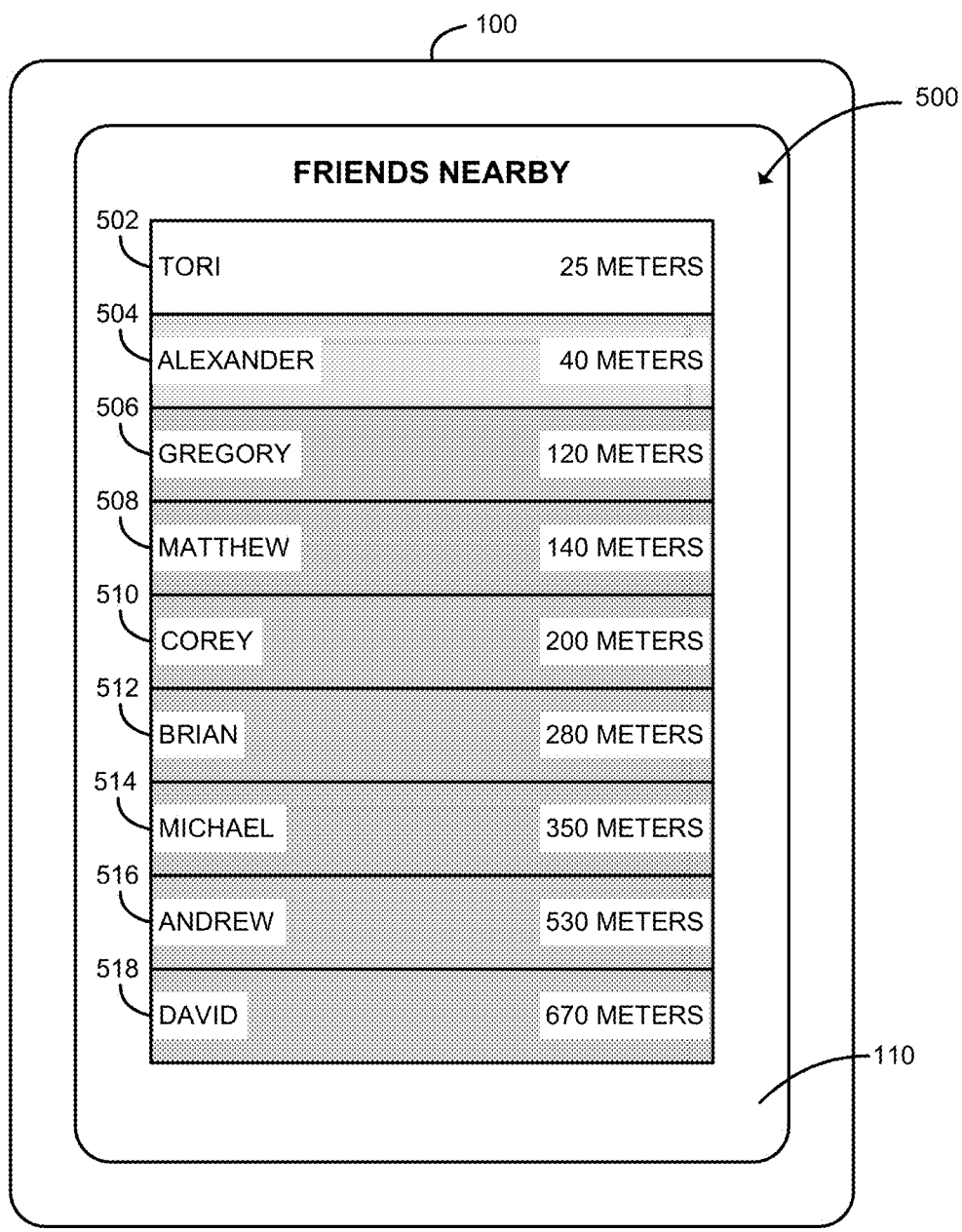
FIG. 5 is a simplified illustration of at least one embodiment of another sort result generated by the method of FIG. 3 and displayed on the display of the mobile computing device of FIGS. 1 and 2.
Figure 6:
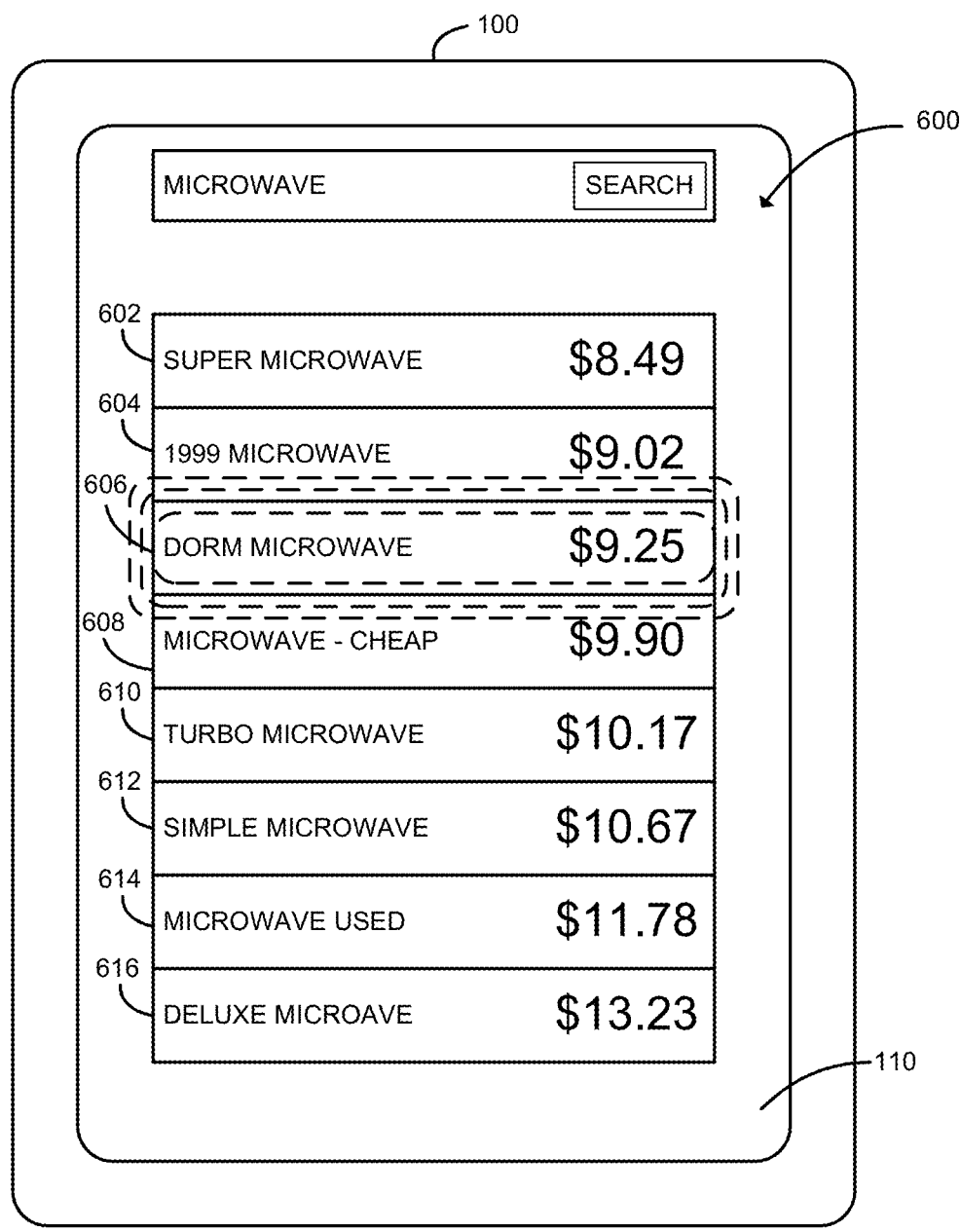
FIG. 6 is a simplified illustration of at least one embodiment of another sort result generated by the method of FIG. 3 and displayed on the display of the mobile computing device of FIGS. 1 and 2.

Referring now to FIGS. 4-6, several embodiments of sort results of the method 300 generated on the mobile computing device 100 are shown. For example, in the illustrative embodiment of FIG. 4, a data set of recommended software applications 400 has been sorted according to two sort criteria: the number of downloads for each recommended software application and the average rating of each recommended software application. Each sorted data item is displayed as a corresponding data item tile 402, 404, 406, 408, 410, and 412. The first sort criteria (i.e., the number of downloads) has been assigned the visual property of location on the display 110. As such, the recommended applications are listed in descending order according to their associated number of downloads (i.e., the data item 402 has the highest number of downloads). The second sort criteria (i.e., the average user rating) has been assigned the visual property of width of the data item tile (e.g., in addition to an assigned minimum width). As such, the data item tiles having larger widths indicate of a higher average rating for the associated recommended application (e.g., the data item 402 has the highest average rating followed by the data item 404). Each data item tile includes the name of the associated software application as well as additional information such as the name of the developer of the associated software application. Additionally, for those data item tiles have larger widths and surface areas, additional information including, for example, the top user review, is displayed on the data item tile (e.g., see data item tiles 402, 404). In this way, the user of the mobile computing device can quickly review a sorted, multi-criteria sort of the recommended applications based on the number of downloads and average user rating.

In the illustrative embodiment of FIG. 5, a data set of friends 500 located nearby the user of the mobile computing device 100 has been sorted according to two sort criteria: the distance away from the user and the length of time the friend has been at his/her current location. Each sorted data item is displayed as a corresponding data item tile 502, 504, 506, 508, 510, 512, 514, 516, and 518. The first sort criteria (i.e., the distance away from the user) has been assigned the visual property of location on the display 110. As such, the friends 500 located nearby the user are listed in ascending order according to their associated distance from the user (i.e., the friend associated with data item 502 is closest to the user). The second sort criteria (i.e., the length of time the friend has remained at his/her current location) has been assigned the visual property of background color of the data item tile (as indicated in the FIG. 5 via background hashing). As such, each data item tile has a different color according to how long the corresponding friend has remained at his/her current location. For example, darker tones may be used to denote a short duration, while lighter tones may denote a longer duration (e.g., the friend "Tori" associated with data item 502 has stayed at her current location for the longest duration). In some embodiments, each visual property may represent a window of values, rather than discrete values. For example, the friends "Gregory" and "Matthew" are indicated as staying at their respective locations for similar durations, which may be within a window of 5, 10, 15, or more minutes of each other. Again, each data item tile includes the name of the associated friend 500 as well as the estimated distance to the respective friend. In this way, the user of the mobile computing device 100 can quickly review a sorted, multi-criteria sort of his/her friends based on the distance to the friend and how long the friend has remained at their current location.

In the illustrative embodiment of FIG. 6, a data set of auction items 600 that were generated by a search query has been sorted according to two sort criteria: price and expiration time. Each sorted data item is displayed as a corresponding data item tile 602, 604, 606, 608, 610, 612, 614, and 616. The first sort criteria (i.e., price) has been assigned the visual property of location on the display 110. As such, the auction items 600 are listed in descending order according to their associated price (i.e., the data item 602 is the lowest cost auction item). The second sort criteria (i.e., expiration time) has been assigned the visual property of glowing animation. As such any items that have reached a threshold of expiration time (i.e., the auction is about to expire) begin to glow (e.g., data item 606 is about to expire and, as such, is shown with a glow animation as indicated by the hashed boundary lines in FIG. 6). The intensity or rate of the glow animation may increase as the individual data item gets closer to expiration. Again, each data item tile includes the name of the associated auction item 600 as well as the price of the auction item 600. In this way, the user of the mobile computing device 100 can quickly review a sorted, multi-criteria sort of desired auction items 600 based on price and auction expiration.

Although the technologies described above have been presented in the context of a "mobile" computing device 100, it should be appreciated that the disclosed technologies may be incorporated in a stationary computing device. That is, in some embodiments, the computing device 100 may be embodied as a stationary or non-mobile computing device such as a desktop computer, an enterprise-level computer, a server, a network appliance such as a "smart" television," or other mobile or non-mobile computing device.

EXAMPLES

Illustrative examples of the devices, systems, and methods disclosed herein are provided below. An embodiment of the devices, systems, and methods may include any one or more, and any combination of, the examples described below.

Example 1 includes a computing device for displaying sort results on a display. The computing device comprises a data sorting module to (i) determine a plurality of sort criteria of a set of data items to be sorted, (ii) associate a different visual property for each determined sort criteria, (iii) and sort the set of data items as a function of the plurality of sort criteria to generate a sort result having a sorting order of the set of data items; and a display module to display the sort result on the display as a function of the plurality of sort criteria using the visual property associated with each sort criteria to identify the sorting order of corresponding sort criteria.

Example 2 includes the subject matter of Example 1, and wherein the data sorting module is to further determine a sort priority for each of the plurality of sort criteria relative to each other, and sort the set of data items as a function of the (i) plurality of sort criteria and the (ii) sort priority for each of the plurality of sort criteria to generate a sort result having a sorting order of the set of data items.

Example 3 includes the subject matter of any of Examples 1 and 2, and wherein the data sorting module is to determine the plurality of sort criteria as a function of a user selection of the plurality of sort criteria.

Example 4 includes the subject matter of any of Examples 1-3, and wherein the data sorting module is to retrieve a pre-defined selection of the plurality of sort criteria from a memory of the computing device and determine the plurality of sort criteria as a function of the pre-defined selection.

Example 5 includes the subject matter of any of Examples 1-4, and wherein the data sorting module is to retrieve a pre-defined selection of the plurality of sort criteria as a function of the type of data items to be sorted.

Example 6 includes the subject matter of any of Examples 1-5, and wherein the display module is to display each data item of the sort result as a data item tile, and the different visual property for each determined sort criteria comprises one of: a position on a display screen of the computing device of the data item tile, a width of the data item tile, a height of the data item tile, a background color of the data item tile, a text attribute of the data item tile, a graphical effect of the data item tile, and an animation effect of the data item tile.

Example 7 includes the subject matter of any of Examples 1-6, and wherein the data sorting module is to receive a user selection of each different visual property to be associated with each determined sort criteria.

Example 8 includes the subject matter of any of Examples 1-7, and wherein the data sorting module is to access a reference database that correlates sort criteria to visual properties, and determine each different visual property by comparing each sort criteria to the reference data base.

Example 9 includes the subject matter of any of Examples 1-8, and wherein the reference database is stored on a server remote from and accessible to the computing device over a network.

Example 10 includes the subject matter of any of Examples 1-9, and wherein the display module is to modify each different visual property of each sorted data item as a function of the sort order of the corresponding soft criteria.

Example 11 includes the subject matter of any of Examples 1-10, and wherein the display module is to detect a user's manipulation of a data item tile displayed on a display of the computing device, the data item tile corresponding to one of the sorted data items of the set of data items; and display additional information or controls in the data item tile in response to the detected manipulation of the data item tile.

Example 12 includes one or more machine readable storage media comprising a plurality of instructions stored thereon that in response to being executed result in a computing device determining at least a first sort criteria and a second sort criteria of a set of data items to be sorted; associating a first visual property of the set of data items with the first sort criteria and a second visual property of the set of data items with the second sort criteria; determining a sort priority for the first sort criteria and the second sort criteria relative to each other; sorting the set of data items as a function of (i) the first and second sort criteria and (ii) the sort priority of the first and second sort criteria to generate a sort result having a sorting order of the set of data items; and displaying the sort result on the computing device using the first visual property to identify the sorting order of the first sort criteria and the second visual property to identify the sorting order of the second sort criteria.

Example 13 includes the subject matter of Example 12, and wherein determining the first and second sort criteria comprises receiving, on the computing device, a user selection of the first and second sort criteria of the set of data items to be sorted.

Example 14 includes the subject matter of any of Examples 12 and 13, and wherein determining the first and second sort criteria comprises retrieving a pre-defined selection of the first and second sort criteria of the set of data items from a memory of the computing device.

Example 15 includes the subject matter of any of Examples 12-14, and wherein retrieving the pre-defined selection comprises retrieving a pre-defined selection of the first and second sort criteria of the set of data items from a memory of the computing device as a function of the type of data items to be sorted.

Example 16 includes the subject matter of any of Examples 12-15, and wherein each data item is displayed on the display of the computing device as a data item tile, and associating the first and second visual properties comprises defining each of a first visual property and a second visual property, different from the first visual property, of each data item tile as one of: a position on a display screen of the computing device of the data item tile, a width of the data item tile, a height of the data item tile, a background color of the data item tile, a text attribute of the data item tile, a graphical effect of the data item tile, and an animation effect of the data item tile.

Example 17 includes the subject matter of any of Examples 12-16, and wherein associating the first and second visual properties comprises receiving, on the computing device, a user selection of a first visual property to be associated with the first criteria and a second visual property to be associated with the second criteria.

Example 18 includes the subject matter of any of Examples 12-17, and wherein associating the first and second visual properties comprises accessing a reference database that correlates sort criteria to visual properties, and determining the first and second visual property by comparing the first and second sort criteria to the reference database.

Example 19 includes the subject matter of any of Examples 12-18, and wherein accessing the reference database comprises accessing a reference database over a network.

Example 20 includes the subject matter of any of Examples 12-19, and wherein displaying the sort result comprises modifying the first visual property of each data item of the set of data items as a function of the sort order of the first sort criteria; and modifying the second visual property of each data item of the set of data items as a function of the sort order of the second sort criteria.

Example 21 includes the subject matter of any of Examples 12-20, and wherein the plurality of instructions further result in the computing device detecting a user's manipulation of a data item tile displayed on a display of the computing device, the data item tile corresponding to one of the sorted data items of the set of data items; and displaying additional information or controls in the data item tile in response to the detected manipulation of the data item tile.

Example 22 includes the subject matter of any of Examples 12-21, and wherein determining at least a first and second sort criteria comprises determining a plurality of sort criteria of the set of data items to be sorted; associating the first and second visual property comprises associating a separate visual property of the set of data items with each determined sort criteria; sorting the set of data items comprises sorting the set of data items a function of the plurality of sort criteria to generate a sort result having a sorting order of the set of data items; and displaying the sort result comprises displaying the sort result using the associated visual properties to identify the sorting order of the plurality of sort criteria.

Example 23 includes a method for displaying sort results on a computing device. The method comprises determining, on the computing device, at least a first sort criteria and a second sort criteria of a set of data items to be sorted; associating, on the computing device, a first visual property of the set of data items with the first sort criteria and a second visual property of the set of data items with the second sort criteria; sorting the set of data items as a function of the first and second sort criteria to generate a sort result having a sorting order of the set of data items; and displaying the sort result on the computing device using the first visual property to identify the sorting order of the first sort criteria and the second visual property to identify the sorting order of the second sort criteria.

Example 24 includes the subject matter of Example 23, and wherein determining the first and second sort criteria comprises receiving, on the computing device, a user selection of the first and second sort criteria of the set of data items to be sorted.

Example 25 includes the subject matter of any of Examples 23 and 24, and wherein determining the first and second sort criteria comprises retrieving a pre-defined selection of the first and second sort criteria of the set of data items from a memory of the computing device.

Example 26 includes the subject matter of any of Examples 23-25, and wherein retrieving the pre-defined selection comprises retrieving a pre-defined selection of the first and second sort criteria of the set of data items from a memory of the computing device as a function of the type of data items to be sorted.

Example 27 includes the subject matter of any of Examples 23-26, and wherein each data item is displayed on the display of the computing device as a data item tile, and associating the first and second visual properties comprises defining each of a first visual property and a second visual property, different from the first visual property, of each data item tile as one of: a position on a display screen of the computing device of the data item tile, a width of the data item tile, a height of the data item tile, a background color of the data item tile, a text attribute of the data item tile, a graphical effect of the data item tile, and an animation effect of the data item tile.

Example 28 includes the subject matter of any of Examples 23-27, and wherein associating the first and second visual properties comprises receiving, on the computing device, a user selection of a first visual property to be associated with the first criteria and a second visual property to be associated with the second criteria.

Example 29 includes the subject matter of any of Examples 23-28, and, wherein associating the first and second visual properties comprises accessing a reference database that correlates sort criteria to visual properties, and determining the first and second visual property by comparing the first and second sort criteria to the reference database.

Example 30 includes the subject matter of any of Examples 23-29, and wherein accessing the reference database comprises accessing, using the computing device, a reference database over a network.

Example 31 includes the subject matter of any of Examples 23-30, and wherein displaying the sort result comprises modifying the first visual property of each data item of the set of data items as a function of the sort order of the first sort criteria; and modifying the second visual property of each data item of the set of data items as a function of the sort order of the second sort criteria.

Example 32 includes the subject matter of any of Examples 23-31, and further including determining a sort priority for the first sort criteria and the second sort criteria relative to each other, and wherein sorting the set of data items comprises sorting the set of data items as a function of (i) the first and second sort criteria and (ii) the sort priority of the first and second sort criteria to generate a sort result having a sorting order of the set of data items.

Example 33 includes the subject matter of any of Examples 23-32, and further including detecting a user's manipulation of a data item tile displayed on a display of the computing device, the data item tile corresponding to one of the sorted data items of the set of data items; and displaying additional information or controls in the data item tile in response to the detected manipulation of the data item tile.

Example 34 includes the subject matter of any of Examples 23-33, and wherein determining at least a first and second sort criteria comprises determining a plurality of sort criteria of the set of data items to be sorted; associating the first and second visual property comprises associating a separate visual property of the set of data items with each determined sort criteria; sorting the set of data items comprises sorting the set of data items a function of the plurality of sort criteria to generate a sort result having a sorting order of the set of data items; and displaying the sort result comprises displaying the sort result using the associated visual properties to identify the sorting order of the plurality of sort criteria.

Example 35 includes a computing device comprising a processor; and a memory having stored therein a plurality of instructions that when executed by the processor cause the computing device to perform the method of any of Examples 23-34.

Example 36 includes one or more machine readable storage media comprising a plurality of instructions stored thereon that in response to being executed result in a computing device performing the method of any of Examples 23-24.

The invention claimed is:

1. A computing device for displaying sort results on a display, the computing device comprising:
   a physical processor to establish:
      a data sorting module to (i) access a set of data items stored on the computing device, (ii) determine a plurality of sort criteria of the set of data items to be sorted, (iii) associate a different visual property for each determined sort criterion, (iv) sort the set of data items as a function of the plurality of sort criteria to generate a sort result having a sorting order of the set of data items, and (v) store the sorted set of data items on the computing device; and
      a display module to display each data item of the set of data items on the display as a data item tile as a function of the plurality of sort criteria using each visual property associated with each sort criterion to identify the sorting order of corresponding sort criterion,
      wherein the different visual property for each determined sort criteria comprises one of: a position on a display screen of the computing device of the data item tile, a width of the data item tile, a height of the data item tile, a background color of the data item tile, a text attribute of the data item tile, a graphical effect of the data item tile, or an animation effect of the data item tile.

2. The computing device of claim 1, wherein the data sorting module is to further:
   determine a sort priority for each of the plurality of sort criteria relative to each other, and
   sort the set of data items as a function of the (i) plurality of sort criteria and the (ii) sort priority for each of the plurality of sort criteria to generate a sort result having a sorting order of the set of data items.

3. The computing device of claim 1, wherein the data sorting module is to retrieve a pre-defined selection of the plurality of sort criteria from a memory of the computing device and determine the plurality of sort criteria as a function of the pre-defined selection.

4. The computing device of claim 3, wherein the data sorting module is to retrieve a pre-defined selection of the plurality of sort criteria as a function of the type of data items to be sorted.

5. The computing device of claim 1, wherein the data sorting module is to receive a user selection of each different visual property to be associated with each determined sort criteria.

6. The computing device of claim 1, wherein the data sorting module is to:
   access a reference database that correlates sort criteria to visual properties, and
   determine each different visual property by comparing each sort criteria to the reference data base.

7. The computing device of claim 1, the display module is to modify each different visual property of each sorted data item as a function of the sort order of the corresponding soft criteria.

8. The computing device of claim 1, wherein the display module is to:
   detect a user's manipulation of a particular data item tile of the data item tiles associated with the set of data items; and
   display additional information or controls in the particular data item tile in response to the detected manipulation of the particular data item tile.

9. One or more machine readable storage media comprising a plurality of instructions stored thereon that in response to being executed result in a computing device:
   determining a plurality of sort criteria of a set of data items to be sorted;
   associating a different visual property for each determined sort criterion;
   sorting the set of data items as a function of the plurality of sort criteria to generate a sort result having a sorting order of the set of data items; and
   displaying each data item of the set of data items on the computing device as a data item tile as a function of the plurality of sort criteria using each visual property associated with each sort criterion to identify the sorting order of corresponding sort criterion,
   wherein the different visual property for each determined sort criteria comprises one of: a position on a display screen of the computing device of the data item tile, a width of the data item tile, a height of the data item tile, a background color of the data item tile, a text attribute of the data item tile, a graphical effect of the data item tile, or an animation effect of the data item tile.

10. The one or more machine readable storage media of claim 9, wherein determining the plurality of sort criteria comprises retrieving a pre-defined selection of the plurality of sort criteria of the set of data items from a memory of the computing device.

11. The one or more machine readable storage media of claim 9, wherein associating each different visual property comprises receiving, on the computing device, a user selection of each different visual property to be associated with each determined sort criteria.

12. The one or more machine readable storage media of claim 9, wherein associating each different visual property comprises:
  accessing a reference database that correlates sort criteria to visual properties, and
  determining each different visual property by comparing each sort criteria to the reference database.

13. The one or more machine readable storage media of claim 9, wherein displaying each data item of the set of data items comprises:
  modifying at least one visual property of each data item of the set of data items as a function of the sort order of at least one sort criteria of the plurality of sort criteria.

14. The one or more machine readable storage media of claim 9, wherein the plurality of instructions further result in the computing device:
  detecting a user's manipulation of a particular data item tile of the data item tiles associated with the set of data items; and
  displaying additional information or controls in the particular data item tile in response to the detected manipulation of the particular data item tile.

15. A method for displaying sort results on a computing device, the method comprising:
  accessing, by the computing device, a set of data items stored on the computing device;
  determining, on the computing device, at least a first sort criteria and a second sort criteria of a set of data items to be sorted;
  associating, on the computing device, a different visual property for each determined sort criterion;
  sorting the set of data items as a function of the plurality of sort criteria to generate a sort result having a sorting order of the set of data items;
  storing, on the computing device, the sorted set of data items; and
  displaying each data item of the set of data items on the computing device as a data item tile as a function of the plurality of sort criteria using each visual property associated with each sort criterion to identify the sorting order of corresponding sort criterion,
  wherein the different visual property for each determined sort criteria comprises one of: a position on a display screen of the computing device of the data item tile, a width of the data item tile, a height of the data item tile, a background color of the data item tile, a text attribute of the data item tile, a graphical effect of the data item tile, or an animation effect of the data item tile.

16. The method of claim 15, wherein associating each different visual property comprises:
  accessing a reference database that correlates sort criteria to visual properties, and
  determining each different visual property by comparing each sort criteria to the reference database.

17. The method of claim 15, wherein displaying each data item of the set of data items comprises:
  modifying at least one visual property of each data item of the set of data items as a function of the sort order of at least one sort criteria of the plurality of sort criteria.

18. The method of claim 15, further comprising:
  determining a sort priority for each of the plurality of sort criteria relative to each other, and
  wherein sorting the set of data items comprises sorting the set of data items as a function of (i) the plurality of sort criteria and (ii) the sort priority for each of the plurality of sort criteria to generate a sort result having a sorting order of the set of data items.

19. The computing device of claim 1, wherein the data sorting module is further to:
  retrieve the set of data items from a remote source; and
  store the data of data items on the computing device.

* * * * *

UNITED STATES PATENT AND TRADEMARK OFFICE
CERTIFICATE OF CORRECTION

| | |
|---|---|
| PATENT NO. | : 9,679,083 B2 |
| APPLICATION NO. | : 13/729339 |
| DATED | : June 13, 2017 |
| INVENTOR(S) | : Benchenaa et al. |

Page 1 of 1

It is certified that error appears in the above-identified patent and that said Letters Patent is hereby corrected as shown below:

On the Title Page

(72) Inventors: remove "Daren P. Wilson" and insert --Darren P. Wilson--.

Signed and Sealed this
Thirteenth Day of March, 2018

Andrei Iancu
*Director of the United States Patent and Trademark Office*